US007691344B2

(12) United States Patent
Yoshimura

(10) Patent No.: US 7,691,344 B2

(45) Date of Patent: Apr. 6, 2010

(54) OIL RECONVERSION DEVICE FOR WASTE PLASTICS

(75) Inventor: Takeki Yoshimura, 91-10, Matushiro, Matushiromachi, Nagano-shi, Nagano 381-1231 (JP)

(73) Assignees: Takeki Yoshimura, Nagano-Shi (JP); Atushi Yoshimura, Tokyo (JP); Shinichi Yoshimura, Nagano-Shi (JP); Yasuhiro Yoshimura, Tokyo (JP); Makiko Yoshimura, Nagano-Shi (JP)

( * ) Notice: Subject to any disclaimer, the term of this patent is extended or adjusted under 35 U.S.C. 154(b) by 691 days.

(21) Appl. No.: 10/586,047

(22) PCT Filed: Jan. 12, 2005

(86) PCT No.: PCT/JP2005/000618

§ 371 (c)(1), (2), (4) Date: Jul. 14, 2006

(87) PCT Pub. No.: WO2005/068587

PCT Pub. Date: Jul. 28, 2005

(65) Prior Publication Data

US 2007/0187224 A1 Aug. 16, 2007

(30) Foreign Application Priority Data

Jan. 15, 2004 (JP) ............................ 2004-008066
Jan. 15, 2004 (JP) ............................ 2004-008067

(51) Int. Cl.
*B01J 19/00* (2006.01)
*C10G 1/00* (2006.01)
*C08J 11/08* (2006.01)
*H05B 6/24* (2006.01)

(52) U.S. Cl. ....................... 422/198; 422/187; 422/202; 422/205; 422/209; 585/241; 110/229; 110/341; 110/344; 110/345; 110/346

(58) Field of Classification Search ................. 422/187, 422/198, 202, 205, 209; 585/241; 110/229, 110/341, 344, 345, 346
See application file for complete search history.

(56) References Cited

U.S. PATENT DOCUMENTS 2,707,712 A * 5/1955 Depmer et al. ................ 554/12

(Continued)

FOREIGN PATENT DOCUMENTS

JP 63-178195 A 7/1988

(Continued)

OTHER PUBLICATIONS

Machine translation of JP 06-287572.*

(Continued)

*Primary Examiner*—Walter D Griffin
*Assistant Examiner*—Huy-Tram Nguyen
(74) *Attorney, Agent, or Firm*—Birch, Stewart, Kolasch & Birch, LLP

(57) ABSTRACT

An oil reconversion devices 1$a$ and 1$b$ for waste plastics which thermally crack a waste plastic Ro by heating it and converts a generated cracker gas Gr into oil by cooling it, equipped with a thermal cracking bath 2 which has a bath main body 4 placed inside a coil 3 . . . , induction-heats the bath main body 4 by feeding a high-frequency current through the coil 3 . . . , and thermally cracks at least a molten plastic Rd obtained from the waste plastic Ro to generate the cracker gas Gr, an injection port 5 through which the waste plastic Ro is injected, a feeder 6 which supplies the waste plastic Ro injected through this injection port 5 to the thermal cracking bath 2 via a forced or direct feeding means Ua or Ub without a bath, and an oil conversion processor 7 which cools and converts the cracker gas Gr generated by the thermal cracking bath 2 into oil.

6 Claims, 10 Drawing Sheets

U.S. PATENT DOCUMENTS

| | | | | | |
|---|---|---|---|---|---|
| 2,726,851 | A | * | 12/1955 | Krupp et al. | 366/147 |
| 3,418,841 | A | * | 12/1968 | Issenmann | 73/19.01 |
| 3,625,932 | A | * | 12/1971 | Green | 526/65 |
| 3,739,710 | A | * | 6/1973 | Costa et al. | 99/348 |
| 3,746,659 | A | * | 7/1973 | Horzepa | 502/9 |
| 3,947,256 | A | * | 3/1976 | Tsukagoshi et al. | 585/241 |
| 4,110,844 | A | * | 8/1978 | Nakamura | 366/83 |
| 4,584,421 | A | * | 4/1986 | Saito et al. | 585/241 |
| 4,851,601 | A | * | 7/1989 | Fukuda et al. | 585/241 |
| 4,993,593 | A | * | 2/1991 | Fabiano et al. | 222/1 |
| 5,055,273 | A | * | 10/1991 | Wilhelm et al. | 422/135 |
| 5,504,267 | A | * | 4/1996 | Platz | 585/241 |
| 5,584,969 | A | * | 12/1996 | Nagai et al. | 196/116 |
| 5,597,451 | A | * | 1/1997 | Nagai et al. | 201/4 |
| 5,639,937 | A | * | 6/1997 | Hover et al. | 585/241 |
| 5,738,025 | A | * | 4/1998 | Tachibana | 110/346 |
| 5,895,827 | A | * | 4/1999 | Takahashi et al. | 585/241 |
| 6,683,227 | B2 | * | 1/2004 | Platz et al. | 585/241 |
| 6,866,830 | B2 | * | 3/2005 | Kwak | 422/193 |
| 7,173,150 | B2 | * | 2/2007 | Yazaki et al. | 562/483 |
| 2002/0156332 | A1 | * | 10/2002 | Jiang | 585/240 |
| 2003/0019789 | A1 | * | 1/2003 | Kwak | 208/85 |
| 2003/0225299 | A1 | * | 12/2003 | Yazaki et al. | 562/483 |
| 2004/0157174 | A1 | * | 8/2004 | Sano et al. | 430/569 |
| 2004/0220337 | A1 | * | 11/2004 | Tsutsumi et al. | 525/107 |
| 2006/0093533 | A1 | * | 5/2006 | Fellinger et al. | 422/131 |

FOREIGN PATENT DOCUMENTS

| | | | |
|---|---|---|---|
| JP | 6-287572 | A | 10/1994 |
| JP | 7-268353 | A | 10/1995 |
| JP | 11-5984 | A | 1/1999 |
| JP | 2002-309270 | A | 10/2002 |
| JP | 2003-96469 | A | 4/2003 |
| JP | 2003-261880 | A | 9/2003 |

OTHER PUBLICATIONS

Machine translation of JP 2002-309270.*
Machine translation of JP 2003-096469.*
Machine translation of JP 07-268353.*
Machine translation of JP 2003-261880.*
Machine translation of JP 11-005984.*
Translation of JP (2003-096469)—Nov. 2008.*
Machine translation for JP-07-268353—Oct. 2, 2008.*

* cited by examiner

OIL RECONVERSION DEVICE FOR WASTE PLASTICS

FIELD OF TECHNOLOGY

The present invention relates to an oil reconversion device for recycling waste plastics.

BACKGROUND TECHNOLOGY

Japanese Unexamined Patent Publication 2003-96469 discloses a conventionally known waste plastics oil reconversion device which reconverts waste plastics (high-polymer wastes) heavy oil (Grade-A heavy oil equivalent) after thermally cracking it by heating.

The oil reconversion device is equipped with a melting bath which has a first crucible placed inside a first coil, induction-heats the first coil by feeding a high-frequency current through the first coil, and melts solid waste plastics such as polyethylene, polysterol, and vinyl chloride contained in the first crucible at around 250° C. (70° C. for vinyl chloride), which is a relatively low temperature to obtain a molten plastic, and a thermal cracking bath which has a second crucible placed inside a second coil, induction-heats the second crucible by feeding high-frequency current through the second coil, and thermally cracks the molten plastic contained in the second crucible by heating it to a high temperature of around 450° C. (170° C. for vinyl chloride) to generate a cracker gas, which when cooled obtains a heavy oil.

However, the following problems remain to be solved for such a waste plastics conventional oil reconversion device.

First, because the waste plastics inside the first crucible to be induction-heated are heated as it is being agitated, its melting performance is limited and is insufficient from the viewpoint of rapid melting and further homogeneous and high-quality melting.

Second, because construction is adopted wherein the bottom of the first crucible and the bottom of the second crucible are connected through a communicating tube, in which an open/close valve is installed, the manufacturing process becomes complex, making cleaning and maintenance difficult when the communicating tube is clogged.

Third, because it is equipped with two melting baths and a thermal cracking bath, although fit for processing a large amount of waste plastic, in processing small amounts of waste plastic, the large scale of the overall device may lead to a decrease in installability and universal usability, increasing running costs due to increased unnecessary power consumption.

The present invention has the objective of providing an oil reconversion device for waste plastics solves such problems of the background technology.

DISCLOSURE OF THE INVENTION

In order to solve these problems, the present invention is characterized in constructing oil reconversion devices 1*a* and 1*b* for waste plastics which thermally crack waste plastic Ro by heating it and converting a generated cracker gas Gr into oil by cooling, and is equipped with a thermal cracking bath 2 which has a bath main body 4 placed inside a coil 3 . . . , induction-heats the bath main body 4 by feeding high-frequency current through the coil 3 . . . , and thermally cracks at least the molten plastic Rd obtained from a waste plastic Ro to generate the cracker gas Gr, an injection port 5 through which the waste plastic Ro is injected, a feeder 6 which supplies the waste plastic Ro injected through the injection port 5 to the thermal cracking bath 2 via a forced or direct feeding means Ua or Ub without a bath, and an oil conversion processor 7 which cools and converts the cracker gas Gr generated by the thermal cracking bath 2 into oil.

BEST FORMS FOR EMBODYING THE INVENTION

The best embodiment forms of the present invention are explained in detail hereafter, based on the drawings.

First, the construction of an oil reconversion device 1*a* for waste plastics of the first embodiment form of the present invention is explained referring to FIG. 1~FIG. 7.

Figure 1:
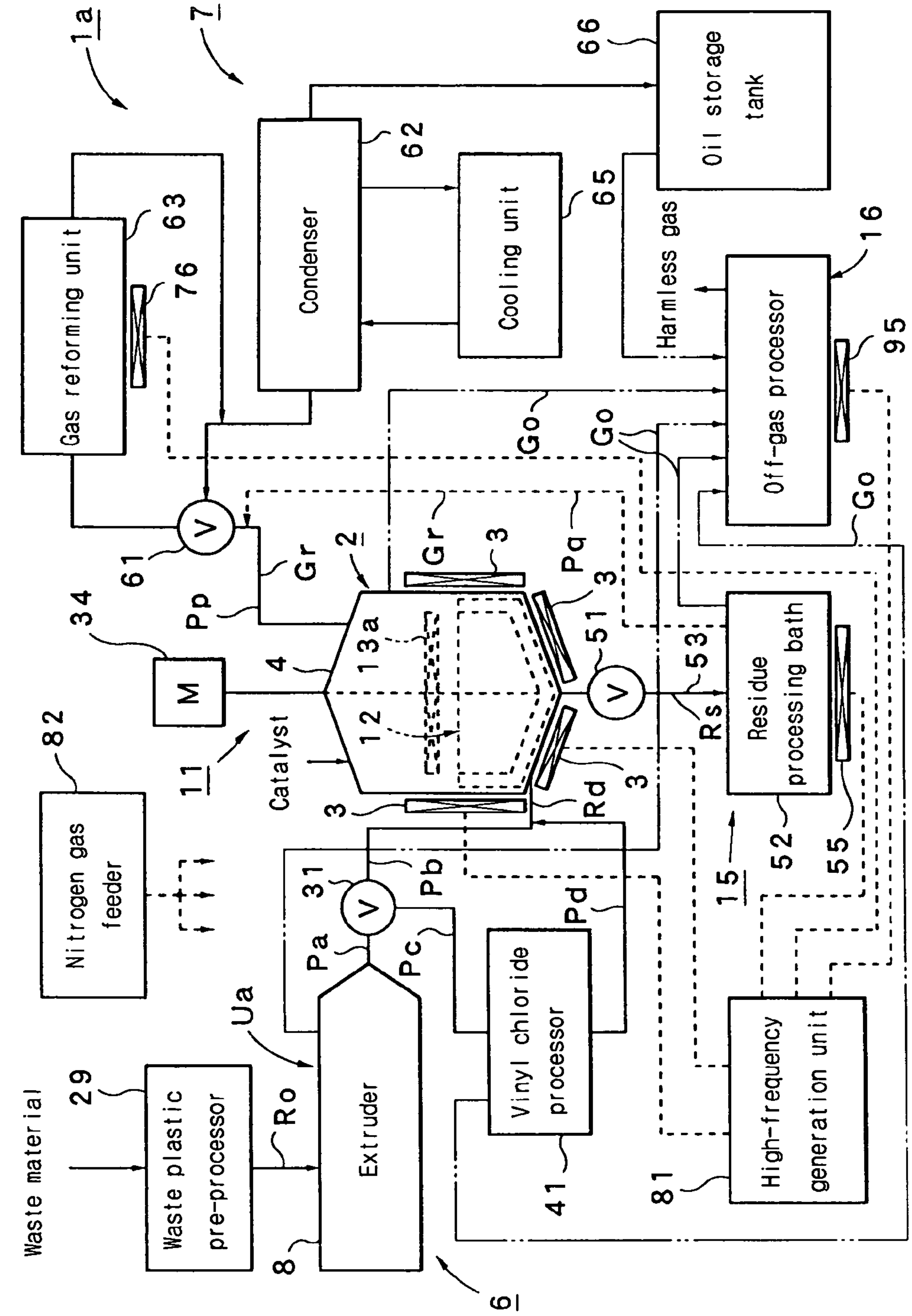
FIG. 1 is a block system diagram of an oil reconversion device of the first embodiment form of the present invention.
Figure 2:
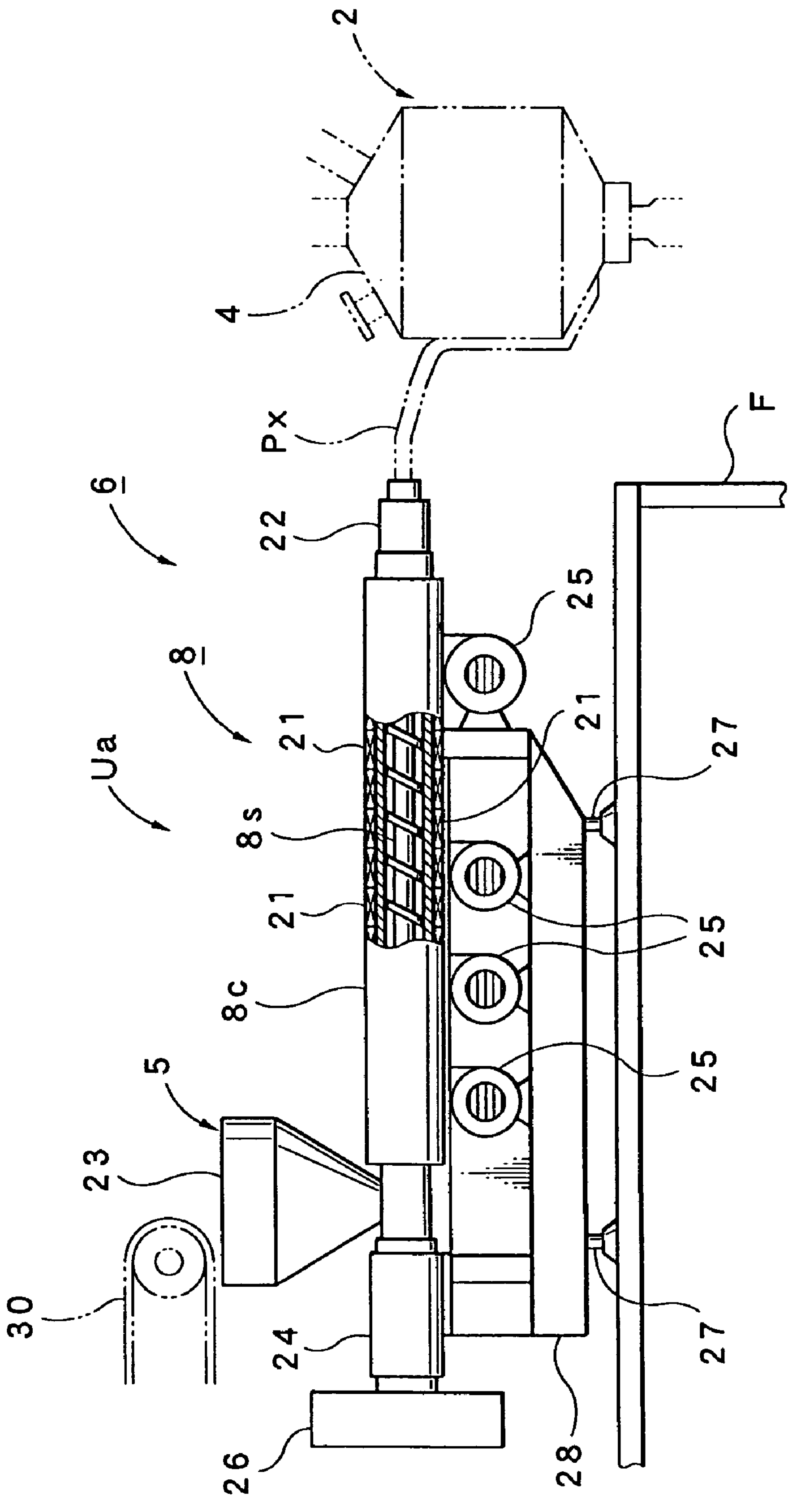
FIG. 2 is a partial cross-sectional side view of an extruder in the same oil reconversion device.

Shown in FIG. 1 is the overall construction of the oil reconversion device 1*a*. The main unit of the oil reconversion device 1*a* is equipped with an extruder 8, a thermal cracking bath 2, and an oil conversion processor 7.

The extruder 8 constitutes a feeder 6 as a forced feeding means Ua which melts and extrudes the waste plastic Ro injected through the injection port 5, is equipped with a heating cylinder 8*c* with a heater 21 . . . installed on its outer circumference, and has an extruding nozzle 22 on the front end of the heating cylinder 8*c* and a hopper 23 the top end of which becomes the injection port 5 on the rear section. The heating cylinder 8*c* contains an extruding screw 8*s*. The extruding screw 8*s* is rotationally driven by a screw rotation driver 24 installed on the rear end of the heating cylinder 8*c*. No. 25 represents multiple cooling blowers which cool the heating cylinder 8*c* 26 is an extruder controller, 28 is a machine stage having multiple legs 27, and F is a frame of the oil reconversion device 1*a*.

On the other hand, 29 represents a waste plastic pre-processor for obtaining the waste plastic Ro injected into the hopper 23 of the extruder 8. Contained in the waste plastic reprocessor 29 are a separation process to separate waste materials, a crushing process to crush the waste plastic Ro, a washing process to wash the crushed waste plastic Ro, a drying process to dry it, etc. The waste plastic Ro obtained through such pre-processing, is injected into the hopper 23 by a waste plastic injection means such as a conveyer 30, shown in FIG. 2.

On the other hand, the tip port of the extruding nozzle 22 connects to the entrance port of a three-way valve 31 via an air line Pa as shown in FIG. 1. Also, an exit port of the three-way valve 31 connects to the feeding port 33 of a thermal cracking bath 2 via an air line Pb, the other exit port of the three-way valve 31 connects to the receiving side of a vinyl chloride processor 41 via an air line Pc. Further, the sending side of the vinyl chloride processor 41 connects to the feeding port 33 of the thermal cracking bath 2 via an air line Pd. Because vinyl chloride processor 41 can be selectively connected, and if vinyl chloride is not processed, the tip port of the extruding nozzle 22 and the feeding port 33 of the thermal cracking bath 2 may be directly connected through the single air line Px shown in FIG. 2, or if only vinyl chloride is processed, it may be made a dedicated processing system wherein the vinyl chloride processor 41 is connected between the tip port of the extruding nozzle 22 and the feeding port 33 of the thermal cracking bath 2.

Figure 4:
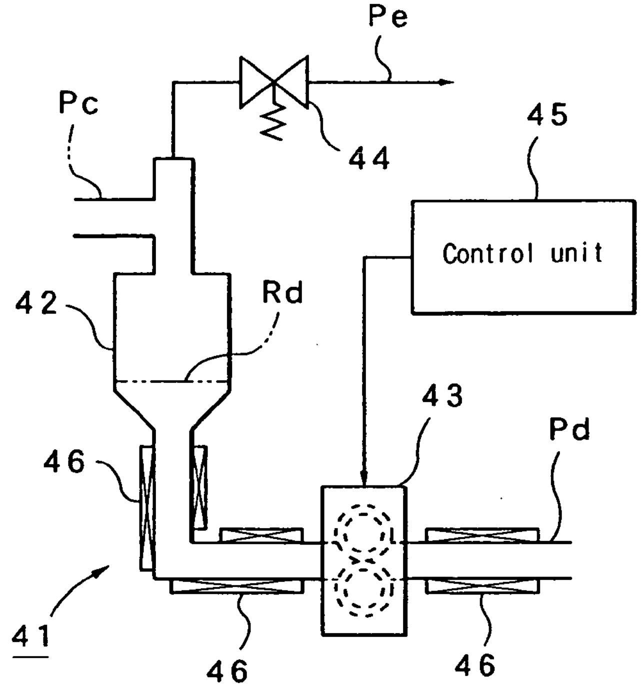
FIG. 4 is a schematic construction diagram of a vinyl chloride processor in the same oil reconversion device.

Shown in FIG. 4 is a schematic construction diagram of vinyl chloride processor 41. Vinyl chloride processor 41 has a reservoir unit 42 the upper end port of which connects to the air line Pc, and the lower end port of which connects to the air line Pd. Also, a gear pump 43 is connected to the middle of the air line Pd. Furthermore, the upper end port of reservoir unit 42 connects to the receiving side of the off-gas processor 16, described later, via an air line Pe. No. 44 is an open/close valve connected to the air line Pe, 45 is a control unit which controls the gear pump 43, and 46 is a heater installed with the air line Pd. Such a heater 46 is similarly installed with air lines Pa, Pb, Pc, Px, and is covered with a thermal insulation material if necessary.

Figure 3:
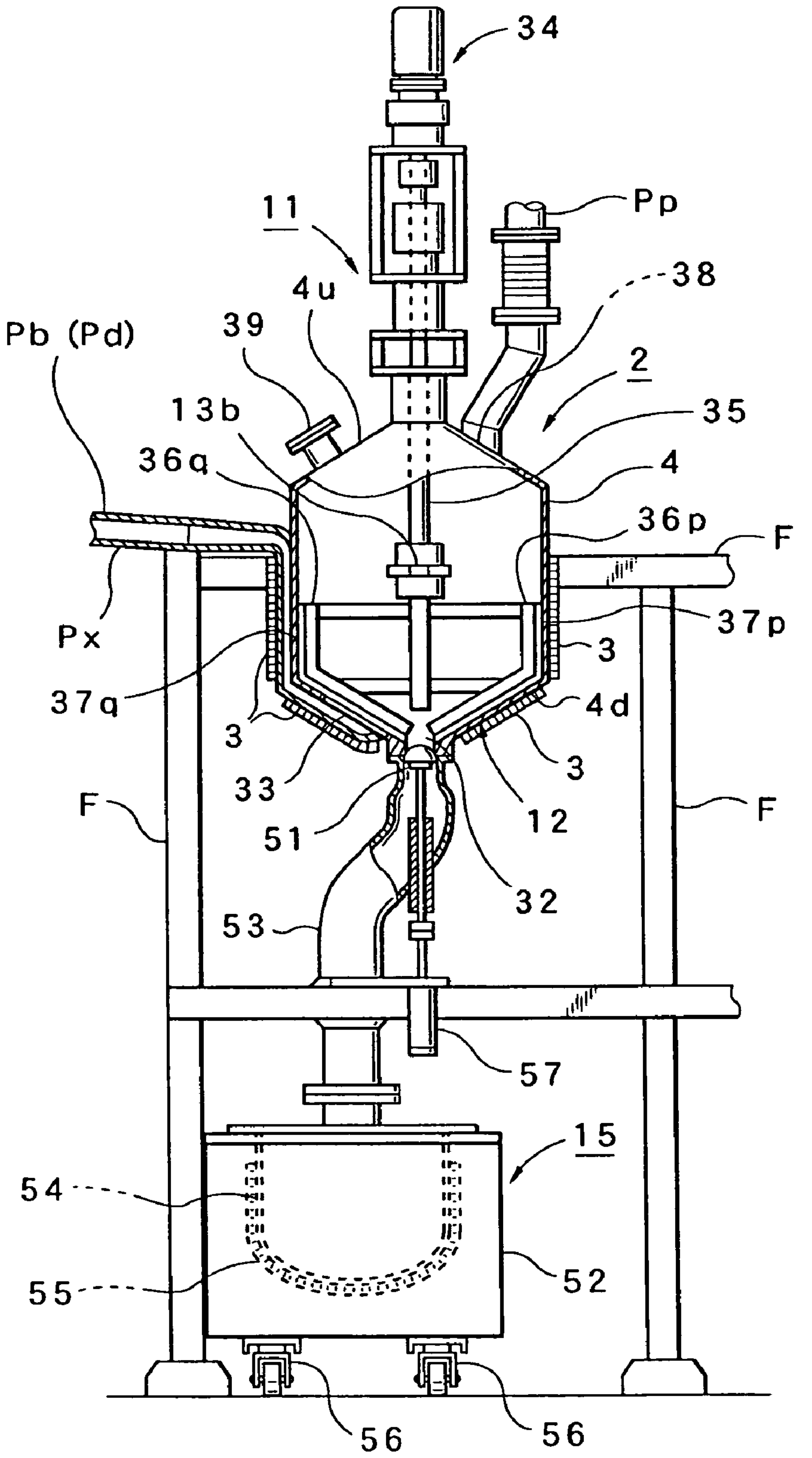
FIG. 3 is a partial cross-sectional side view of a thermal cracking bath and a residue processing bath in the same oil reconversion device.

As shown in FIG. 3, the thermal cracking bath 2 is constructed placing the bath main body 4 inside the coil 3 . . . . In this case, because approximately the lower half of the bath main body 4 is actually used as a bath, the coil 3 . . . is also placed in approximately the lower half of the bath main body 4, which in turn has an exhaust hole 32 for residue plastic Rs on the center of a bottom section 4*d* and a feeding port 33 for molten plastic Rd installed on a position other than the center of the bottom section 4*d*. Feeding port 33 is connected to air lines Pb (Pd) and Px. The bath main body 4 is made of iron, alumina, etc. so that induction heating is performed when a high-frequency current is fed to the coil 3 . . . .

Figure 5:
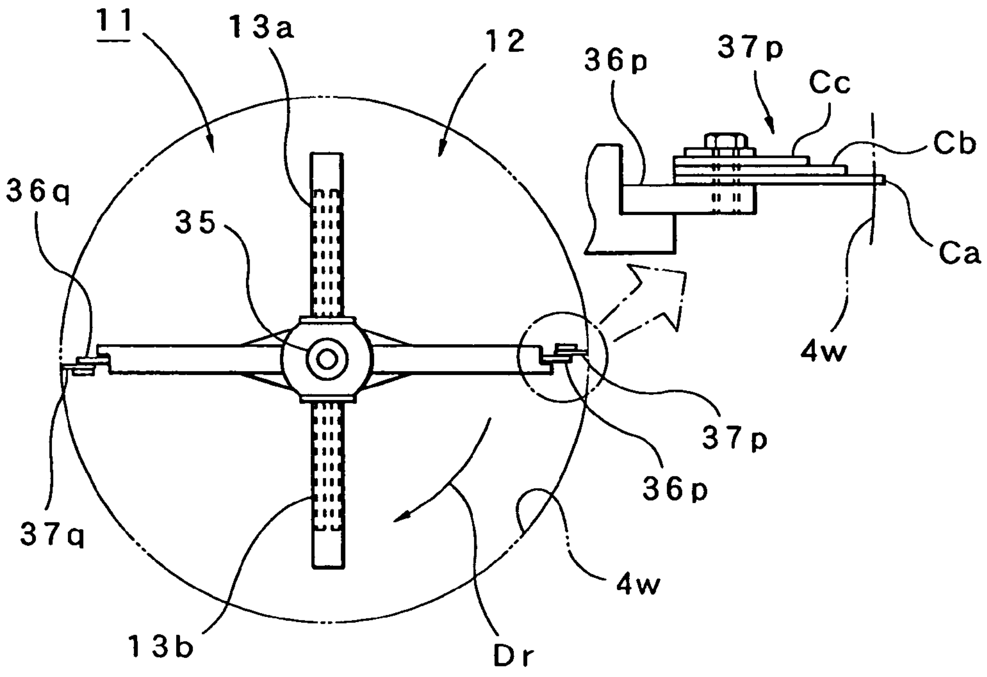
FIG. 5 is a plane view of an agitate-scraping unit in a agitating mechanism unit built in the same oil reconversion device.

Also, an agitating mechanism unit 11 is installed in the thermal cracking bath 2. The agitating mechanism unit 11 is equipped with an agitate-scraping unit 12 placed inside the bath main body 4 and a rotation driver (driving motor) 34 installed on the outer upper end of the bath main body 4. In the center of the agitate-scraping unit 12 is a shaft 35 which is rotated by the rotation driver 34. As shown in FIG. 5, a pair of agitating blades 36*p* and 36*q* project in the diameter direction of shaft 35 at 180° relative to each other, and scraping blades 37*p* and 37*q* are installed to the tips of the agitating blades 36*p* and 36*q*. The scraping blade 37*p* and 37*q* are constructed to contact the inner wall 4*w* of at least the lower half section of the interior of the bath main body 4. In this case, as shown as in an extracted and expanded view in FIG. 5, one scraping blade 37*p* (the same for the other scraping blade 37*q*) is constructed by stacking three pieces of stainless-steel plates Ca, Cb, and Cc of different projection lengths, the longest stainless steel plate Ca being given a length projecting more outwardly than the inner wall 4*w*. By this means, the tip of the scraping blade 37*p* . . . pressure makes contact with the inner wall 4*w* in a bent state. Arrow Dr indicates the direction of rotation of the scraping blade 37*p* . . . in FIG. 5.

Installed on a shaft 35 positioned above the scraping blades 37*p* and 37*q* are heaters 13*a* and 13*b* which heat the top surface of the molten plastic Rd contained in the bath main body 4. As shown in FIG. 5, heaters 13*a* and 13*b* diametrically project from the shaft 35 at 180° relative to each other, and are at right angles relative to the agitating blade 36*p* . . . (scraping blade 37*p* . . . ).

On the other hand, a gas exit port 38 for the cracker gas Gr is installed on the ceiling 4*u* of the bath main body 4, and this gas exit port 38 connects to the receiving side of the oil conversion processor 7 described later via an air line Pp. Furthermore, installed on the ceiling 4*u* is a catalyst injector, not shown, which feeds a catalyst such as zeolite which promotes thermal cracking into the bath main body 4. No. 39 is a safety valve.

The thermal cracking bath 2 constructed in this manner is supported at a specified height by a frame F as shown in FIG. 3. Then, an open/close valve 51 is installed with the exhaust hole 32 on the bottom section 4*d*, a holding space for a residue processing bath 52 is secured under the thermal cracking bath 2, and the residue processing bath 52 placed in the holding space and the exhaust hole 32 are connected via an exhaust pipe 53 curved in an S shape. In this case, the lower end of the exhaust pipe 53 and the residue processing bath 52 are detachably configured. The residue processing bath 52 is equipped with a bath main body 54 comprising, induction-heated by a coil 55 placed on the outer circumference. Also, the interior of the bath main body 54 connects to the receiving side of the oil conversion processor 7, described later, via an air line Pq. The residue processing bath 52 can be moved by multiple casters 56, installed on the bottom face. No. 57 is a linear driver which hoists/lowers a valve body in the open/close valve 51, which can be opened/closed by the linear driver 57. Because the exhaust hole 32 becomes a valve seat, if the valve body is hoisted by the linear driver 57, the open/close valve 51 can be closed, and if the valve body is lowered, the open/close valve 51 can be opened.

The oil conversion processor 7 cools the cracker gas Gr supplied via the air line Pp from the thermal cracking bath 2 and the cracker gas Gr supplied via the air line Pq from the residue processing bath 52 and converts them into oil, wherein the air lines Pp and Pq connect to the entrance port of a three-way valve 61. Also, one exit port of the three-way valve 61 connects to the entrance of a condenser 62, and the other exit port of the three-way valve 61 connects to the entrance of a condenser 62 via a gas reforming unit 63, which functions to crack terephthalic acid generated in large quantities when polyethylene terephthalate (PET) molded forms such as PET bottles are thermally cracked. Because the gas reforming unit 63 can be selectively connected, if no PET molded form is processed, the air lines Pp and Pq may be directly connected to the entrance of the condenser 62, or if only PET dedicated molded forms are processed, a dedicated system may be made which directly connect the air lines Pp and Pq to the receiving side of the gas reforming unit 63.

Figure 6:
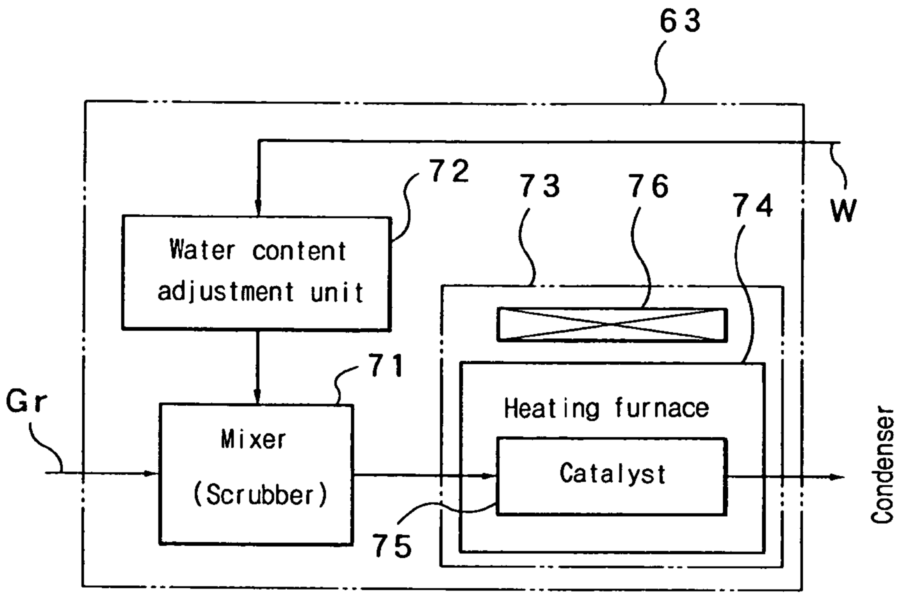
FIG. 6 is a principle construction diagram of a gas reforming unit in the same oil reconversion device.

The gas reforming unit 63 prevents the inconvenience that, when terephthalic acid generated by thermal cracking of PET molded forms is supplied to the condenser 62, it accomplishes crystallization by cooling the condenser 62, generating pipe clogging etc. of a heat exchanger tube inside the condenser 62, and converts terephthalic acid by vapor-phase cracking into a low boiling point compound which does not crystallize. The principle construction of the gas reforming unit 63 is shown in FIG. 6. In the same figure, no. 71 is a mixer (scrubber) which mixes water W into the cracker gas Gr, which water W is supplied via a water content adjustment unit 72 which adjusts the water content. No. 73 is a cracking bath, constituted by placing a catalyst 75 in a heating furnace (an electric furnace) 74. As the cracking bath 73, one having the same structure as a heat exchanger 93 used in the off-gas processor 16, described later, can be utilized, exhausting the cracker gas Gr given from the mixer 71 after contacting the catalyst 75. An acid or base is used as the catalyst 75, silica alumina formed in particles of 300~400 μm can be used as the acid, and calcium oxide—zinc oxide (CaO/ZnO) calcined at 600° C. and made into a powder of 300~400 μm as the base. Also, the heating furnace 74 heats up the cracker gas Gr contacting the catalyst 75 to a reaction temperature of around 500° C. No. 76 is a coil for induction heating in the heating furnace 74.

On the other hand, the condenser 62 functions to cool and convert the cracker gas Gr into oil, wherein the cracker gas Gr is cooled (heat exchanged) with cooling water W circulated from a cooling unit 65. Also, no. 66 is an oil storage tank, in which heavy oil obtained from the condenser 62 is stored. Because water is generated in the condenser 62, in which, in addition to heavy oil, an oil-water separation bath and a filter which separate heavy oil and water are built.

Figure 7:
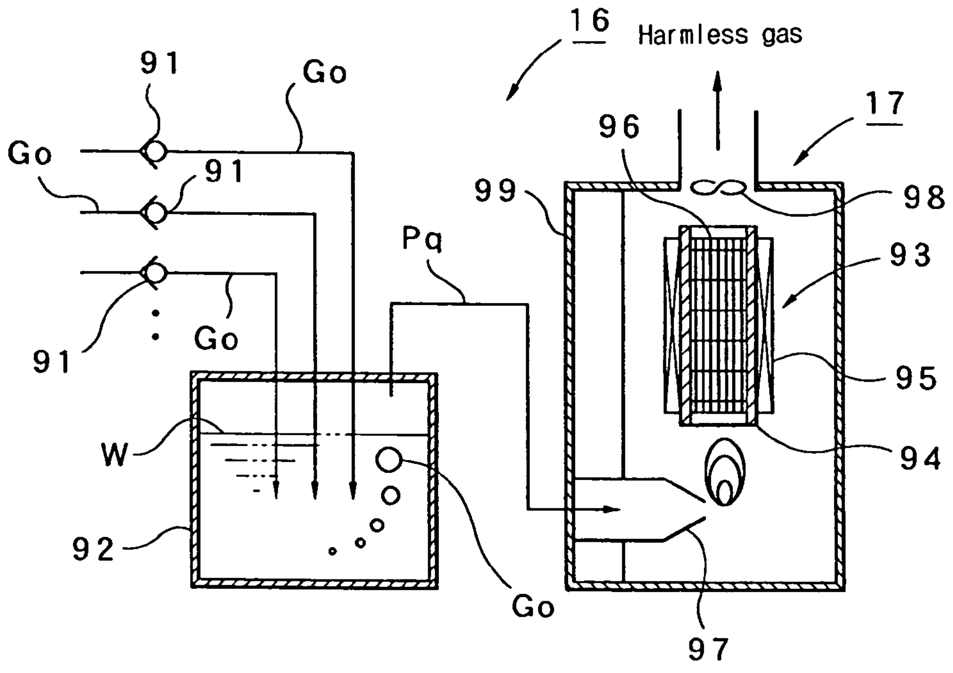
FIG. 7 is a schematic construction diagram of an off-gas processor in the same oil reconversion device.

It is further equipped with the off-gas processor 16. As shown in FIG. 7, the off-gas processor 16 is equipped with a water seal bath 92 for feeding an off-gas Go . . . generated in the process of sequentially processing the waste plastic Ro, namely the heating cylinder 8*c* in the extruder 8, the reservoir unit 42 of the vinyl chloride processor 41, the residue processing bath 52, the thermal cracking bath 2, the oil storage tank 66, etc. into water W via a check valve 91, and a burn processor 17 which burns the off-gas Go . . . floated up from the water seal bath 92 at a high temperature of a specified temperature or higher. Therefore, water W is contained in the water seal bath 92. Also, the burn processor 17 is equipped with a heat exchanger 93, which has a coil 95 for induction heating installed on the outer circumference of the cylinder unit 94, and a heat exchanger 96 formed of a mesh material or porous material having a large contact area for enhancing the heat exchange efficiency inside the cylinder unit 94. No. 97 is a burner which burns the off-gas Go, and 98 is an exhaust fan.

Other than the above, 81 is a high-frequency generation unit, which becomes a power supply unit to feed a high-frequency current to coils 3 . . . , 55, 76, and 95. Also, 82 is a nitrogen gas feeder, which prevents the cracker gas Gr etc. from making direct contact with air by feeding nitrogen gas into the bath main body 4, the bath main body 54, the water seal bath 92, the oil storage tank 66, etc. before opening them to the atmosphere.

Figure 8:
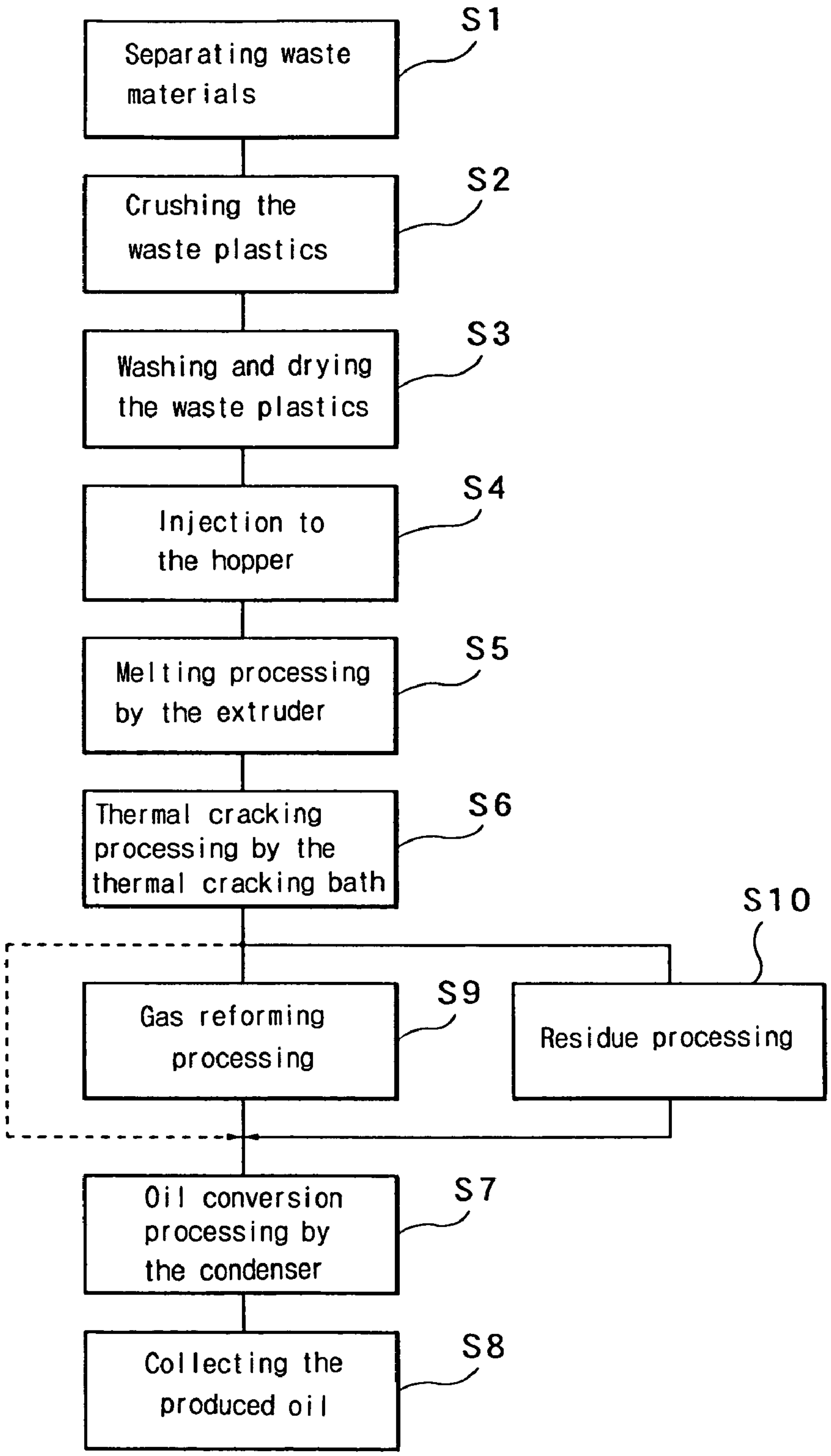
FIG. 8 is a flow chart for explaining the actions of the same oil reconversion device.

The entire operation of the oil reconversion device 1*a* of the first embodiment form is explained hereafter, according to the flow chart shown in FIG. 8 referring to FIGS. 1~7.

First, in the extruder 8, the extruding screw 8*s* rotates by the screw rotation driver 24. Also, the heating cylinder 8*c* is heat controlled to approximately 300° C., necessary for melting the waste plastic Ro by the heater 21 . . . . The heating cylinder 8*c* is heated by the heater 21 . . . , and cooling is performed by the cooling blower 25 . . . .

During operation, the waste plastic Ro is injected into the hopper 23 of the extruder 8, in which case, the waste plastic Ro supplied to the extruder 8 is obtained by the waste plastic pre-processor 29. Namely, in the waste plastic pre-processor 29, collected waste materials are separated, during which mixed foreign materials (metals etc.) are removed (Step S1). Also, the waste plastic Ro obtained by the separation is crushed by a crushing unit creating chips of a specified size or smaller (Step S2). Furthermore, the crushed waste plastic Ro is washed by a washer and dried by a dryer (Step S3), after which dried waste plastic Ro is injected into the hopper 23 by a waste plastic injection means such as the conveyer 30 (FIG. 2) (Step S4).

The waste plastic Ro contained by the extruder 8 is sufficiently melted inside the heating cylinder 8*c* to become molten plastic Rd and is extruded from the extruding nozzle 22 by the rotating extruding nozzle 22 (Step S5). In so doing, if the waste plastic Ro to be processed is a waste plastic Ro of other than vinyl chloride, it is supplied to the interior of the thermal cracking bath 2 from the feeding port 33 via the air lines Pa and Pb (Px) by switching the three-way valve 31.

Conversely, in the case of vinyl chloride, before feeding to the thermal cracking bath 2, processing is performed by the vinyl chloride processor 41, in which case the molten plastic Rd extruded from the extruding nozzle 22 by switching the three-way valve 31 is sent to the receiving side of the vinyl chloride processor 41 via the air line Pc. By this means, in the vinyl chloride processor 41 shown in FIG. 4, operation of the gear pump 43 is controlled by the control unit 45, and the molten plastic Rd of vinyl chloride is tentatively pooled on the upstream side of the gear pump 43. In so doing, so-called degassing is performed on the pooled molten plastic Rd, and generated hydrogen chloride gas is stored in the reservoir unit 42. If a specified amount of hydrogen chloride gas is accumulated in the reservoir unit 42, the open/close valve 44 becomes open, and is supplied to the off-gas processor 16 via the air line Pe as the off-gas Go, by which off-gas processing, described later, is performed in the off-gas processor 16. Also, degassed molten plastic Rd is exhausted from the gear pump 43 and is supplied to the interior of the bath main body 4 from the feeding port 33 via the air line Pd.

On the other hand, the thermal cracking bath 2 has the bath main body 4 induction heated by a high-frequency current fed to the coils 3 from a high-frequency generation unit 81. In so doing, the bath main body 4 is heated to about 450° C., necessary for thermally cracking the molten plastic Rd. The bath main body 4 is heated to about 200° C. while standing by. The heating temperature of the bath main body 4 can be arbitrarily set according to the kind of the molten waste plastic Ro to be processed. Therefore, in the thermal cracking bath 2, the supplied molten plastic Rd is heated to set a high temperature of about 450° C. to thermally crack the molten plastic Rd (Step S6).

Also, in the thermal cracking bath 2, the shaft 35 is rotated by the rotation driver 34 in the agitating mechanism unit 11 to agitate the molten plastic Rd contained in the bath main body 4 with the agitating blades 36*p* and 36*q* of the agitate-scraping unit 12, and the molten plastic Rd adhering to the inner wall 4*w* of the bath main body 4 is scraped off by the scraping blades 37*p* and 37*q*. By this means, easy and sufficient agitation to the molten plastic Rd can be performed, and the melting efficiency of the molten plastic Rd enhanced. Because the scraping blades 37*p* . . . was constructed by stacking three pieces of stainless-steel plates Ca, Cb, and Cc of different projection lengths, residue plastic Rd such as sediment adhering to the inner wall 4*w* of the bath main body 4 can be securely scraped off, preventing the degradation of thermal conductivity due to the residue plastic Rd adhering to the inner wall 4*w*.

Also, the heaters 13*a* and 13*b* also rotate simultaneously by the shaft 35 rotating, and the top surface of the molten plastic Rd contained in the bath main body 4 is heated at a high temperature of about 400~500° C. By this means, thermal cracking of the molten plastic Rd near the top surface can be efficiently and effectively performed. Especially, because the top surface of the molten plastic Rd becomes a paste bubble state, it is heated by the heaters 13*a* and 13*b* to promote secondary cracking. On the other hand, in the thermal cracking bath 2, by the thermal cracking of the molten plastic Rd, the cracker gas Gr is generated, and supplied to the receiving side of the oil conversion processor 7, described later, via the air line Pp from the gas exit port 38 installed on the ceiling 4*u*. In this case, if the waste plastic Ro to be processed is other than PET molded forms, the cracker gas Gr is directly supplied to the condenser 62 by switching the three-way valve 61. In the condenser 62, heavy oil (Grade-A heavy oil equivalent) is generated by cooling (heat exchanging) the cracker gas Gr (Step S7), and the condenser 62 is always cooled with cooling water W from the cooling unit 65. Then, the obtained heavy oil is stored in the oil storage tank 66 (Step S8).

Conversely, if the waste plastic Ro to be processed is a PET molded form, the cracker gas Gr is sent to the gas reforming unit 63, in which gas reforming processing is performed (Step S9). In the gas reforming unit 63, an appropriate amount of water W supplied from the water content adjustment unit 72 is added to the cracker gas Gr by the mixer (scrubber) 71 by the supplied cracker gas Gr containing terephthalic acid. In this case, water W is mixed as water vapor. The cracker gas Gr which passed through the mixer 71 is supplied to the cracking bath 73, and passes through the catalyst 75 employing an acid (silica alumina) or a base (calcium oxide—zinc oxide) placed in the heating furnace (electric furnace) 74. In so doing, the temperature is controlled so that the cracker gas Gr containing terephthalic acid is heated at a temperature around 400~600° C. By this means, terephthalic acid makes contact with the catalyst 75 at high temperature and is supplied to the condenser 62 in the next process. Once it is cooled by the condenser 62, a cracking product is obtained which contains mainly benzene, benzoic acid, and carbon dioxide, the carbon dioxide being the result of cracking of the carboxyl group of terephthalic acid.

In this way, when thermally cracking a PET molded form, although a large amount of terephthalic acid is generated, by passing it through the gas reforming unit 63, terephthalic acid which is a sublimation high boiling point compound is cracked in vapor phase, converted to a cracking product which does not crystallize (low boiling point compound).

On the other hand, when thermal cracking of the molten plastic Rd contained in the thermal cracking bath 2 is almost over, and if the residue plastic Rs remains, the linear driver 57 is controlled to open the open/close valve 51 in a state in which the agitate-scraping unit 12 is rotated, in which case, it is desirable that the residue plastic Rs have fluidity. By this means, the residue plastic Rs falls through the exhaust pipe 53 and is supplied to the interior of the bath main body 54 in the residue processing bath 52. The bath main body 54 is induction-heated by the high-frequency current fed to the coil 55. The high-frequency current is supplied from the high-frequency generation unit 81, and the bath main body 54 is heated to about 400° C., necessary for thermally cracking the residue plastic Rs. Therefore, the residue plastic Rs is further thermally cracked, and the cracker gas Gr generated in the process is supplied to the entrance port of the three-way valve 61 via the air line Pq, oil conversion processing being performed by the oil conversion processor 7. Also, when thermal cracking of the residue plastic Rs comes into the final stage, if only a sediment remains, the heating temperature of the bath main body 54 is increased to 500° C. to burn it off (Step S10). The bath main body 54 is heated to about 200° C. during standby. By installing a residue processing bath 52, thermal cracking, sediment burn-off, etc. can be performed efficiently and effectively. Moreover, cleaning and maintenance can also be performed easily as well as minimizing the residue sediment.

On the other hand, in the off-gas processor 16, the off-gas generated in the process of sequentially processing the waste plastic Ro, namely the off-gas generated inside the heating cylinder 8*c* in the extruder 8, the reservoir unit 42 of the vinyl chloride processor 41, the residue processing bath 52, the thermal cracking bath 2, the oil storage tank 66, etc. is made harmless and released to the atmosphere. In this case, the off-gas Go generated inside the heating cylinder 8*c* in the extruder 8 is led from the venting section of the heating cylinder 8*c* and is supplied into water W contained in the water seal bath 92 via the check valve 91. Also, the off-gas Go generated in the reservoir unit 42 of the vinyl chloride processor 41 is supplied into water W contained in the water seal bath 92 via the air line Pe and the check valve 91 . . . . Furthermore, the off-gas Go generated inside the bath main body 54 in the residue processing bath 52, the off-gas Go generated inside the bath main body 4 of the thermal cracking bath 2, the off-gas Go which remains inside the oil storage tank 66, etc. are also supplied into water W contained in the water seal bath 92 via the check valve 91 . . . in the same way. By this a part of harmful ingredient of the off-gas Go is collected by water W.

On the other hand, the off-gas Go floated up in the water seal bath 92 is supplied to the burn processor 17. The off-gas Go supplied to the burn processor 17 is burned by the burner 97 and sucked by the exhaust fan 98, and passes through the heat exchanger 93. In so doing, in the heat exchanger 93, the cylinder unit 94 is induction-heated by a high-frequency current flowing in the coil 95, and it is burned again at a high temperature of 800° C. or higher, desirably 1000~1300θC. The high-frequency current is supplied from the high-frequency generation unit 81, by which the off-gases Go . . . generated in processing the waste plastic Ro, the molten plastic Rd, the residue plastic Rs, etc., and especially harmful gases such as dioxin, are made harmless ones and released to the atmosphere. In this case, because the cylinder unit 94 has a heat exchanger 96 formed of a mesh material or porous material in order to have a large contact area inside the cylinder unit 94, heat exchange efficiency is enhanced.

Therefore, by such an oil reconversion device 1*a* of the first embodiment form, because it uses the extruder 8 having the heating cylinder 8*c* and the extruding screw 8*s* which melts and extrudes the waste plastic Ro, rapid melting and further homogeneous and high-quality melting of the waste plastic Ro can be realized. Because the molten plastic Ro is extruded by the extruding screw and supplied to the thermal cracking bath 2 by utilizing the extruder 8, the process of supplying the molten plastic Rd becomes simple, and can be supplied more securely, as well providing ease of cleaning and maintenance.

Figure 9:
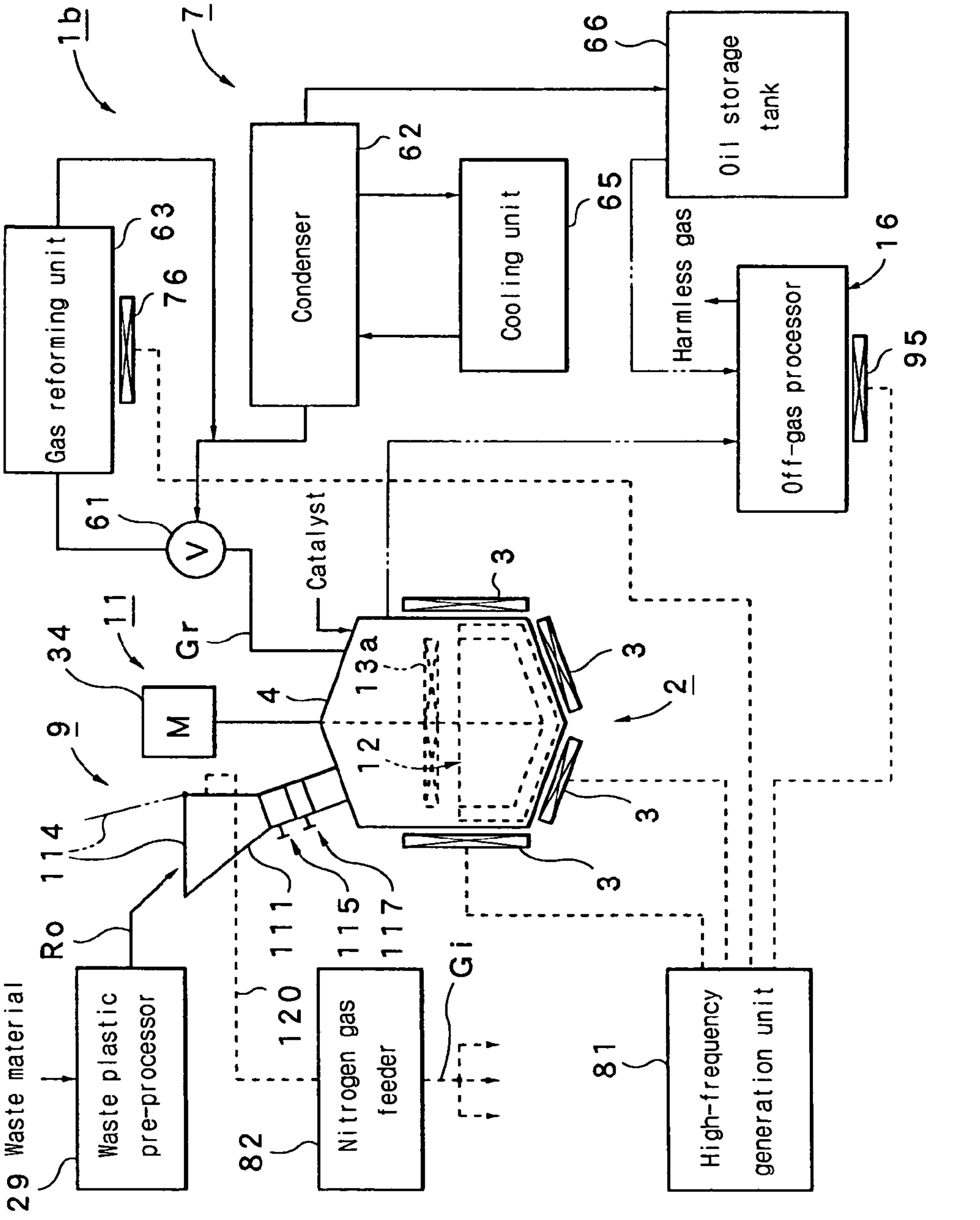
FIG. 9 is a block system diagram of an oil reconversion device of the second embodiment form of the present invention.
Figure 10:
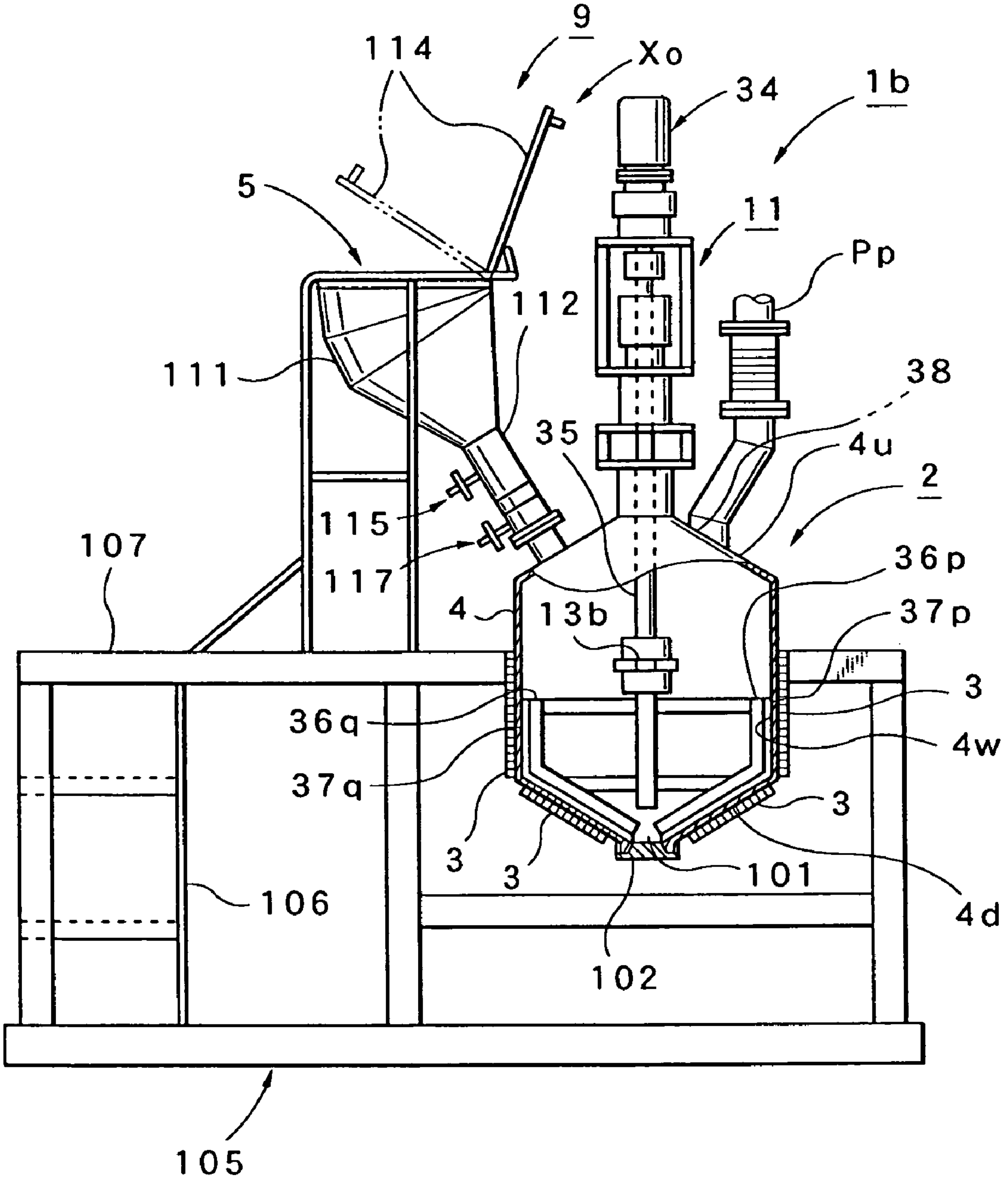
FIG. 10 is a partial cross-sectional side view of a thermal cracking bath in the same oil reconversion device.
Figure 11:
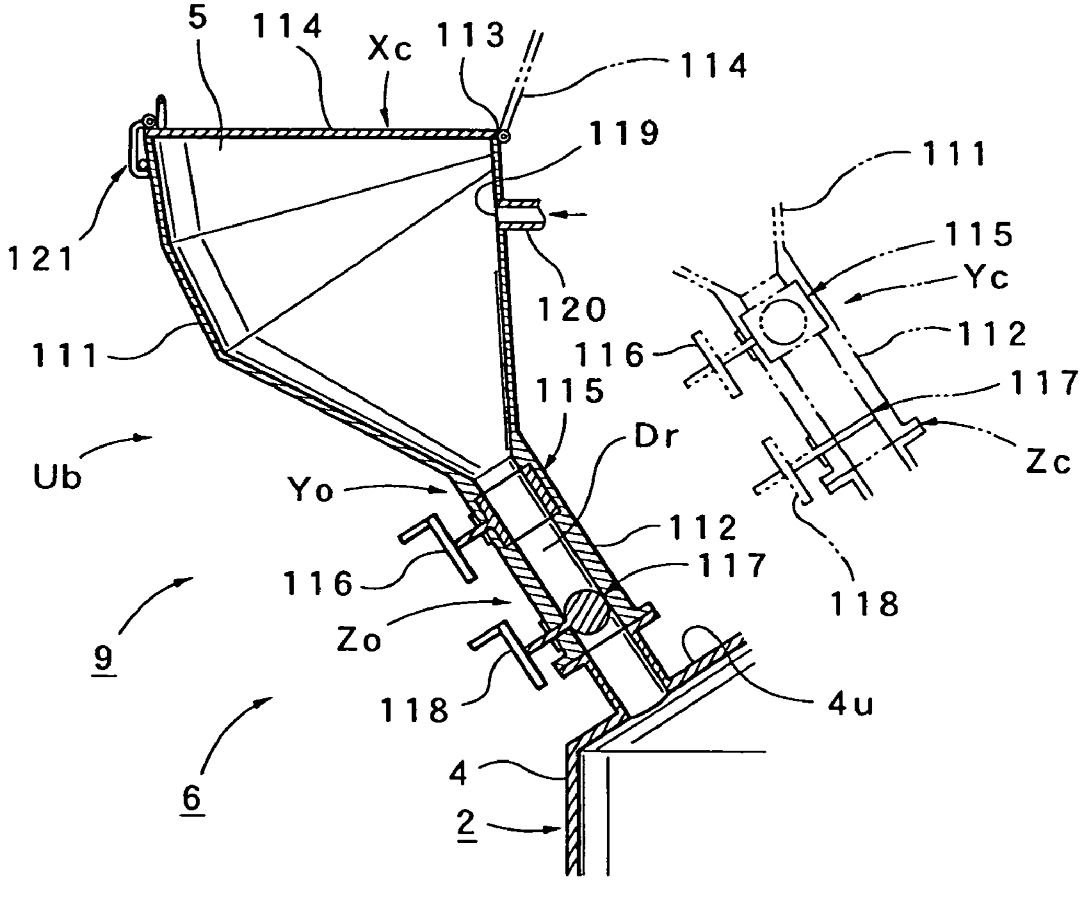
FIG. 11 is a cross-sectional side view of a waste plastic injector built in the same oil reconversion device.
Figure 12:
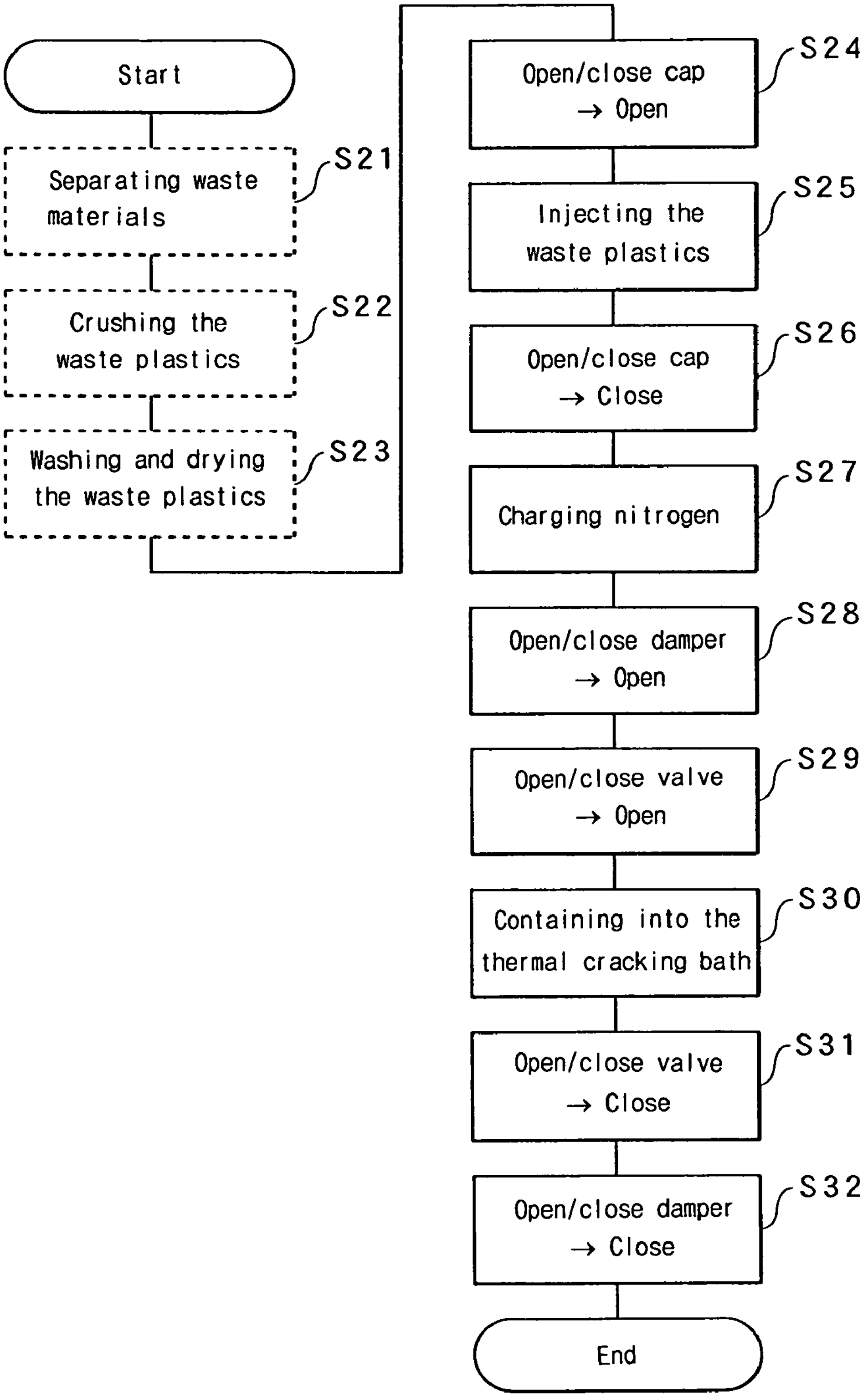
FIG. 12 is a flow chart for explaining the actions of the same oil reconversion device.

The construction of an oil reconversion device 1*b* for waste plastics of the second embodiment form of the present invention is explained hereafter, with reference to FIGS. 9~11.

Shown in FIG. 9 is the overall construction of the oil reconversion device 1*b*. The oil reconversion device 1*b* is equipped as its main part with a thermal cracking bath 2, a waste plastic injector 9, and an oil conversion processor 7.

The thermal cracking bath 2 is constructed as shown in FIG. 10, and its basic construction becomes the same as in the first embodiment form. The thermal cracking bath 2 is constructed by placing a bath main body 4 inside a coil 3 . . . . In this case, because approximately the lower half of the bath main body 4 is actually used as a bath, the coil 3 . . . is also placed in approximately the lower half of the bath main body 4. The bath main body 4 has an exhaust hole 101 for exhausting residue plastic to the outside on the center of a bottom section 4*d*, and a cap 102 is installed to or detached from the exhaust hole 101. The bath main body 4 is made of iron, alumina, etc. so that induction heating is performed when a high-frequency current is fed to the coil 3 . . . . Also, an agitating mechanism unit 11 is installed in the thermal cracking bath 2. The construction of the agitating mechanism unit 11 is the same as in the first embodiment form shown in FIG. 5.

Furthermore, a gas exit port 38 for a cracker gas Gr is installed on a ceiling 4*u* of the bath main body, and connects to the receiving side of the oil conversion processor 7, described later, via an air line Pp. Furthermore, installed on the ceiling 4*u* is a catalyst injector, not shown, which feeds a catalyst such as zeolite which promotes thermal cracking into the bath main body 4. Such a thermal cracking bath 2 is supported at a specified height by a machine stage 105 as shown in FIG. 10. No. 106 is a stairway and 107 is a work stage in the machine stage 105.

On the other hand, the waste plastic injector 9 constitutes a feeder 6 which feeds the waste plastic Ro injected into an injection port 5 to the thermal cracking bath 2 via a direct feeding means Ub which has no melting bath. As shown in FIG. 11, the waste plastic injector 9 has a hopper 111 which supplies the waste plastic Ro to the bath main body 4, and is connected with the ceiling 4*u* of the bath main body 4 by an injection pipe 112 which composes an injection path Dr. The upper end of the hopper 11 becomes the injection port 5 opening upward, to which is installed an open/close cap 114 which rotates up and down via a hinge 113 which opens/closes the injection port 5. The open/close cap 114 in the solid line shown in FIG. 10 indicates a close position Xc, and the open/close cap 114 in a solid line indicates an open position Xo. Also, installed to the upper portion of the injection pipe 112 is an open/close valve 115 which opens/closes the injection path Dr between the hopper 111 and the bath main body 4. No. 116 is an operating handle to open/close the open/close valve 115, which can be switched to a close position Yc shown by the virtual line or an open position Yo shown by the solid line in FIG. 11 by rotating the operating handle 116 by 90° in the forward direction or the reverse direction.

Furthermore, an open/close damper 117 is installed in the injection pipe 112 located in the bath main body 4 side relative to the open/close valve 115, and can be rotated by an operating handle 118. In FIG. 11, the open/close damper 117 in a virtual line shows a state of being rotated to the closed position Zc wherein the injection path Dr is fully closed, and the open/close damper 117 in a solid line shows a state of being rotated to an open position Zo wherein the injection path Dr. is fully open. On the other hand, installed on the side face of the bath main body 4 is an air feeding port 119 which can feed nitrogen gas (an inert gas in general) into the hopper 111, and the air feeding port 119 connects to the nitrogen gas feeder 82 shown in FIG. 9 via an air line 120. No. 121 is a locking mechanism for locking the open/close cap 114 to the close position Xc.

On the other hand, no. 29 is a waste plastic pre-processor for obtaining the waste plastic Ro to be injected into the hopper 111. The waste plastic pre-processor 29 includes a separation process to separate waste materials, a crushing process to crush the waste plastic Ro, a washing process to wash the crushed waste plastic Ro, a drying process to dry it, etc. No. 7 is the same oil conversion processor as in the first embodiment form, which cools the cracker gas Gr supplied from the thermal cracking bath 2 via the air line Pp and converts it into oil. No. 63 is a gas reforming unit built in the oil conversion processor 7, which is the same as in the first embodiment form explained based on FIG. 6. No. 62 is a condenser having a function of cooling the cracker gas Gr and converts it into oil. By this means, the cracker gas Gr is cooled (heat exchanged) with cooling water W supplied in circulation from a cooling unit 65. No. 66 is a oil storage tank, where heavy oil obtained from the condenser 62 is stored. Because water is also generated in addition to heavy oil in the condenser 62, built in the condenser 62 are an oil-water separation bath and a filter which separate heavy oil and water. No. 16 is an off-gas processor, which is the same as in the first embodiment form explained based on FIG. 7. Other than the above, in FIG. 9, no. 81 is a high-frequency generation unit, which becomes a power supply for feeding a high-frequency current to coils 3 . . . , 76, and 95. Also, the nitrogen gas feeder 82 can feed the bath main body 4, a water seal bath 92 (see FIG. 7), the oil storage tank 66, etc. in the same way as in the case of the hopper 111 described above.

The overall operation of the oil reconversion device 1*b* of the second embodiment form is explained hereafter, with reference to FIGS. 9~12.

First, the waste plastic Ro is contained in the thermal cracking bath 2 using the waste plastic injector 9. The method of containing the waste plastic Ro is explained according to a flow chart shown in FIG. 12. First, the waste plastic Ro for injecting into the hopper 111 is prepared. This waste plastic Ro is obtained in the waste plastic pre-processor 29. Namely, in the waste plastic pre-processor 29, the collected waste materials are separated (Step S21). Therefore, if a foreign material (such as metal) is mixed, it is removed. Also, the waste plastic Ro obtained by separation is crushed by a crushing unit to become chips of specific size or smaller (Step S22). Furthermore, the crushed waste plastic Ro is washed by a washer and dried by a dryer (Step S23).

Then, the dried waste plastic Ro is injected into the hopper 111, releasing the locking mechanism 121, and the open/close cap 114 is displaced up to the open position Zo indicated by the solid line in FIG. 10 (Step S24). Both the open/close valve 115 and the open/close damper 117 are closed in this case. Namely, the open/close valve 115 is in the closed position Yc shown by the virtual line in FIG. 11, and the open/close damper 117 is in the closed position Zc shown by the virtual line in FIG. 11.

In this state, the waste plastic Ro obtained by the waste plastic pre-processor 29 is injected into the hopper 111 (Step S25). Once a specified amount of waste plastic Ro is injected into the hopper 111, the open/close cap 114 is closed, and the open/close cap 114 is locked in the close position Zc by the locking mechanism 121 (Step S26). Next, the nitrogen gas feeder 82 is controlled to charge nitrogen gas Gi into the hopper 111 via the air line 120 and the air feeding port 119 (Step S27). By this means, the cracker gas Gr, etc remaining inside the thermal cracking gas 2 is prevented from directly contacting the air.

Next, the operating handle 118 is manually rotated to displace the open/close damper 117 to the open position Zo shown by the solid line in FIG. 11, and afterwards the operating handle 116 is manually rotated to displace the open/close valve 115 to the open position Yo shown by the solid line in FIG. 11 (Steps S28 and S29). By this means, the waste plastic Ro inside the hopper 111 is contained inside the bath main body 4 via the injection pipe 112 (Step S30). Then, once the hopper 111 becomes empty, the operating handle 116 is manually rotated to displace the open/close valve 115 to the close position Yc shown by the virtual line in FIG. 11, and afterwards the operating handle 118 is manually rotated to displace the open/close damper 117 to the close position Zc shown by the virtual line in FIG. 11 (Steps S31, and S32). By this means, containing the waste plastic Ro to the thermal cracking bath 2 is complete.

On the other hand, the thermal cracking bath 2 has its bath main body 4 induction-heated with a high-frequency current flowing in coils 3 . . . . The high-frequency current is fed from the high-frequency generation unit 81. In so doing, the bath main body 4 is heated to about 450° C. which is necessary for thermally cracking the waste plastic Ro. The bath main body 4 is heated to about 200° C. during standby. The heating temperature of the bath main body 4 can be arbitrarily set according to the kind of the waste plastic Ro to be processed. Therefore, in the thermal cracking bath 2, the contained waste plastic Ro is melted and thermally cracked by a set high temperature of about 450° C. Namely, the waste plastic Ro become molten waste plastic by melting, thereby performing further thermal cracking of the molten waste plastic. Therefore, the thermal cracking bath 2 functions also as a melting bath to melt the waste plastic Ro. Also, agitation, etc. by the agitating mechanism unit 11 is performed in the same way as in the first embodiment form.

On the other hand, by the molten plastic being thermally cracked in the thermal cracking bath 2, the cracker Gr is generated and supplied to the receiving side of the oil conversion processor 7 via the air line Pp from the gas exit port 38. Afterwards, processings by the oil conversion processor 7, the off-gas processor 16, the burn processor 17, etc. are performed in the same way as in the first embodiment form.

By such an oil reconversion device 1*b* of the second embodiment form, because it is equipped with the thermal cracking bath 2 which functions also as a melting bath to generate the cracker gas Gr by melting and thermally cracking the waste plastic Ro, installability and general usability can be enhanced by miniaturizing the overall device, and reduction of unnecessary power consumption can contribute to reducing running costs. Because it is equipped with the waste plastic injector 9 which can directly inject waste plastic Ro into the thermal cracking bath 2, the process can be simplified, the waste plastic Ro can be smoothly and securely contained in the thermal cracking bath 2, and furthermore washing, maintenance, etc. can also be easily performed. In addition, because the waste plastic injector 9 has the open/close damper 117 installed to the injection pipe 112 in the bath main body 4 side of the open/close valve 115, the waste plastic Ro can be injected more stably and safely.

While the first embodiment form and the second embodiment form are explained in detail above, the present invention is not limited to these embodiment forms but can be arbitrarily modified, added to, or omitted from within parameters which does not deviate from the spirit of the present invention in the respects of detailed construction, shape, raw material, quantity, method, etc.

INDUSTRIAL APPLICABILITY

As described above, the oil reconversion devices 1*a* and 1*b* of the present invention can be preferably used in reconverting various kinds of waste plastics (polymer wastes) into heavy oil (grade-A heavy oil equivalent), etc.

The invention claimed is:

1. An oil reconversion device for waste plastics which performs thermal cracking by heating a waste plastic and converts the generated cracker gas into oil by cooling, the oil reconversion device comprising:

a thermal cracking bath which has a bath main body placed inside a coil, the thermal cracking bath being adapted to induction-heat the bath main body by feeding a high-frequency current through the coil, and to thermally crack at least a molten plastic obtained from the waste plastic to generate a cracker gas, an injection port through which the waste plastic is injected, a feeder which supplies the waste plastic injected through the injection port to the thermal cracking bath via a forced or direct feeding means without a bath, and an oil conversion processor which cools and converts the cracker gas generated by the thermal cracking bath into oil, wherein the thermal cracking bath includes an agitating mechanism having an agitate-scraping unit, wherein the agitate-scraping unit is adapted to agitate a molten plastic contained in the bath main body, and to scrape the molten plastic adhering to the inner wall of the bath main body, and the agitate-scraping unit includes a heater capable of heating a top surface of the molten plastic contained in the bath main body, wherein the feeder is equipped, as a forced feeding means, with an extruder having a heating cylinder, and an extruding screw which melts and extrudes the waste plastic injected into the injection port, wherein the agitate-scraping unit includes a blade which extends radially from a rotating shaft and which makes contact with an inner wall of the bath main body, and wherein the heater extends radially from the rotating shaft at a position higher than the blade.

2. The oil reconversion device for waste plastics described in claim 1, further comprising a residue processor which is adapted to collect and heat residue plastic generated inside the bath main body, and to supply a generated cracker gas to the oil conversion processor.

3. The oil reconversion device for waste plastics described in claim 2, further comprising an off-gas processor having a burn processor which is adapted to burn an off-gas generated in processes of sequentially processing the waste plastic at a specified temperature or higher.

4. The oil reconversion device for waste plastics described in claim 1, further comprising an off-gas processor having a burn processor which is adapted to burn an off-gas generated in processes of sequentially processing the waste plastic at a specified temperature or higher.

5. An oil reconversion device for waste plastics which performs thermal cracking by heating a waste plastic and converts the generated cracker gas into oil by cooling, the oil reconversion device, comprising:

a thermal cracking bath which has a bath main body placed inside a coil, the thermal cracking bath being adapted to induction-heat the bath main body by feeding a high-frequency current through the coil, and to thermally crack at least a molten plastic obtained from the waste plastic to generate a cracker gas, an injection port through which the waste plastic is injected, a feeder which supplies the waste plastic injected through the injection port to the thermal cracking bath via a forced or direct feeding means without a bath, and an oil conversion processor which cools and converts the cracker gas generated by the thermal cracking bath into oil, wherein the thermal cracking bath includes an agitating mechanism having an agitate-scraping unit, wherein the agitate-scraping unit is adapted to agitate a molten plastic contained in the bath main body, and to scrape the molten plastic adhering to the inner wall of the bath main body, and the agitate-scraping unit includes a heater capable of heating a top surface of the molten plastic contained in the bath main body, wherein the feeder is equipped, as a forced feeding means, with an extruder having a heating cylinder, and an extruding screw which melts and extrudes the waste plastic injected into the injection port, wherein the blade includes a pair of blades extending orthogonally to the rotating shaft at an angle of 180° with respect to each other, wherein each of the blades is provided with a stack of multiple plates extending radially outward from an end thereof, at least one of the multiple plates of each blade making contact with the inner wall in a bent state.

6. The oil reconversion device for waste plastics described in claim 5, wherein the agitate-scraping unit includes a blade which extends radially from a rotating shaft and which makes contact with an inner wall of the bath main body, and wherein the heater extends radially from the rotating shaft at a position higher than the blade.

* * * * *